United States Patent [19]
Lassanske

[11] 3,944,006
[45] Mar. 16, 1976

[54] ENDLESS CLEATED TRACK

[75] Inventor: George G. Lassanske, Oconomowoc, Wis.

[73] Assignee: Outboard Marine Corporation, Waukegan, Ill.

[22] Filed: Aug. 15, 1974

[21] Appl. No.: 497,678

[52] U.S. Cl. .................................. 180/9.62; 305/57
[51] Int. Cl.² .......................................... B62D 55/12
[58] Field of Search ......... 305/21, 35 R, 54, 56, 57, 305/35 EB; 180/9.62, 6.7, 5 R, 6.48

[56] References Cited
UNITED STATES PATENTS

| | | | |
|---|---|---|---|
| 3,250,577 | 5/1966 | Olson | 180/5 R |
| 3,558,198 | 1/1971 | Tomita | 305/54 |
| 3,703,321 | 11/1972 | Schoonover | 305/54 |
| 3,777,832 | 12/1973 | Merenheimo | 180/5 R |

Primary Examiner—Philip Goodman
Assistant Examiner—John A. Carroll
Attorney, Agent, or Firm—Michael, Best & Friedrich

[57] ABSTRACT

Disclosed herein is an inexpensive and mechanically efficient endless track formed from belts of flexible material and supported for movement in parallel spaced relation by a plurality of transverse traction bars or cleats including drive lugs which are located in the spacing between adjacent belts and which, preferably, are formed from a non-metallic material. The drive lugs are received between and drivingly engaged by drive elements or sprocket teeth on a drive wheel aligned with the spacing. The outer radial extremity of the drive elements or sprocket teeth does not extend beyond the inner surfaces of the belts.

10 Claims, 10 Drawing Figures

U.S. Patent   March 16, 1976   3,944,006
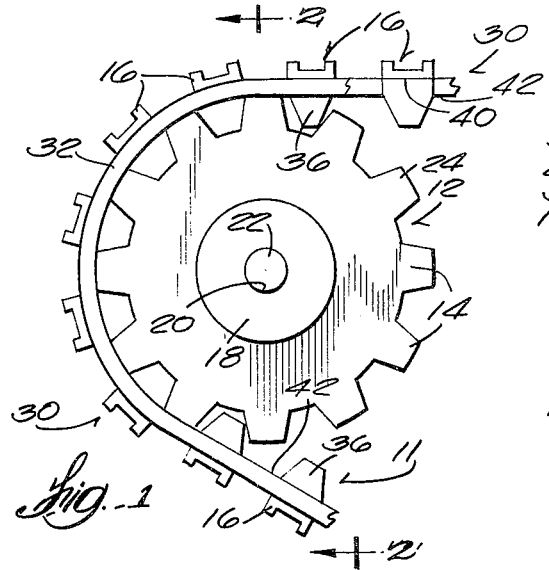
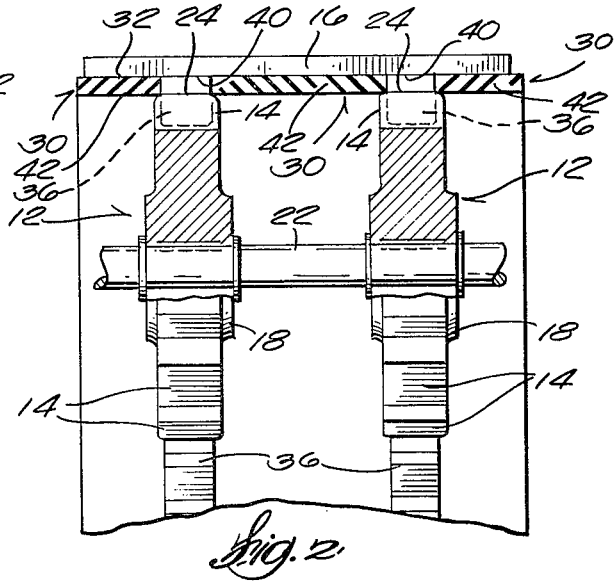
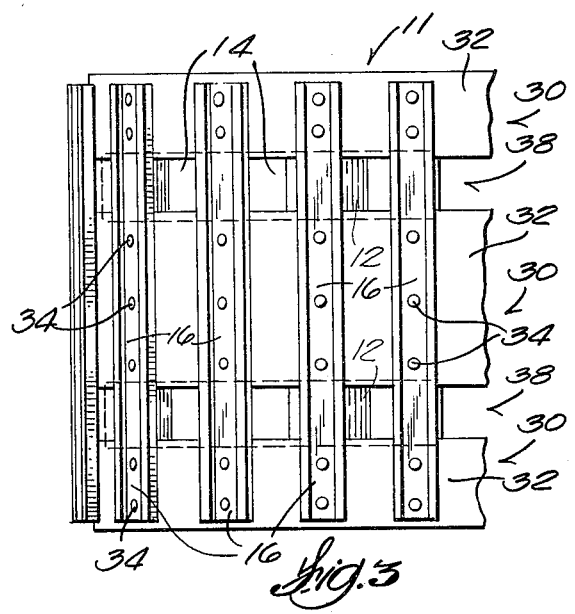
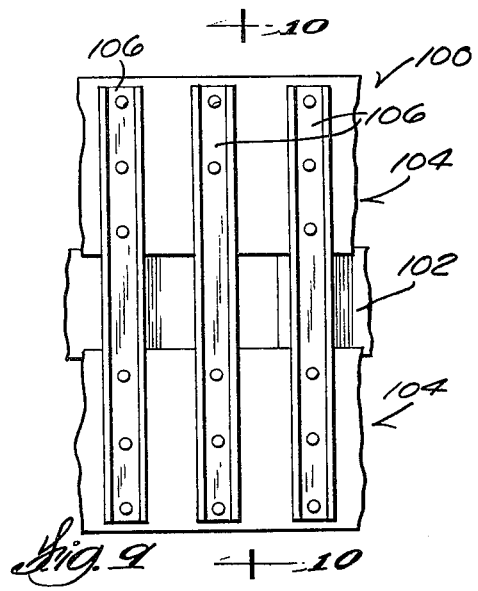
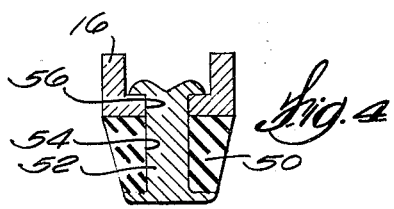
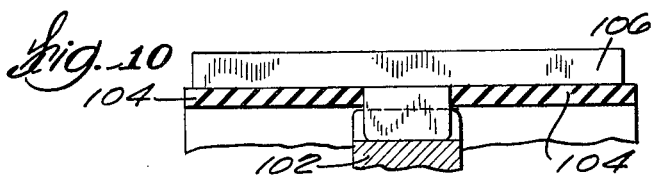
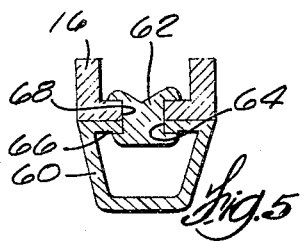
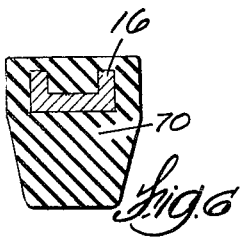
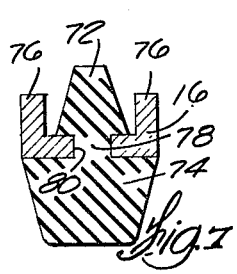
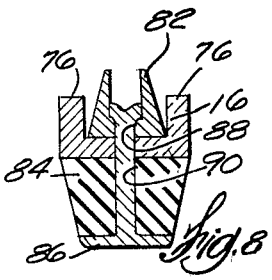

ENDLESS CLEATED TRACK

BACKGROUND OF THE INVENTION

This invention relates to endless tracks for tracked vehicles.

In one construction for endless tracks used to provide traction for vehicles such as snowmobiles, tractors, or the like, a number of flexible belts are interconnected for movement in parallel spaced relation by a plurality of transverse traction bars or cleats secured at spaced intervals to the outer surfaces of the belts. The track is mounted on a drive sprocket and is driven by sprocket teeth which extend through the spacing between adjacent belts and sequentially engage the traction bars or cleats to drive the track. in another construction of such tracks, one or more belts are provided on the inside surface thereof with integral lugs which are drivingly engaged by teeth or tangs on a drive sprocket.

In comparison, the former construction is considerably less expensive to manufacture; however, it is generally known to be substantially less efficient than the latter construction, particularly for high speed operation.

SUMMARY OF THE INVENTION

The inventor provides an endless track which is designed to incorporate the advantages of both of the constructions mentioned above.

More specifically, the invention provides an endless track including a number of flexible belts interconnected for movement in parallel spaced relation by a plurality of transverse traction bars or cleats mounted on the outer surface of the belts at parallel spaced intervals, together with drive lugs which are mounted on the traction bars in the spacing between adjacent belts and which extend inwardly beyond the inner surface of the belts. The track is mounted on a drive wheel or sprocket aligned with the spacing between adjacent belts and having radially extending drive elements or sprocket teeth arranged to receive and drivingly engage the drive lugs.

In accordance with a preferred embodiment, the drive lugs are formed from a non-metallic material, such as rubber, and means are provided for securing the drive lugs to the traction bars. In one embodiment, the drive lugs are formed from a moldable material and are bonded to the traction bars by molding integrally with the traction bars. In another embodiment, the drive lugs are secured to the traction bars by mechanical fastening means extending through apertures provided in the drive lug and the traction bar.

Also, in accordance with the invention, lateral stability of the track can be improved by providing at least one side skid lug mounted on the outer or ground-engaging side of the traction bar and projecting outwardly beyond the outermost extremity of the traction bars. In one embodiment, the side skid lugs and the drive lugs are formed from the same moldable material and are molded in situ on the traction bars with an integral connecting or coupling portion extending through an aperture provided in the traction bar. In another embodiment, the side skid lugs and the drive lugs are connected in coupled relation by mechanical fastening means extending through apertures provided in the side skid lug, the traction bar, and the drive lug.

Also in accordance with the invention, there is provided a drive wheel aligned with the spacing between adjacent belts of the track and including drive elements which drivingly engage the lugs and which have an outer radial extremity terminating short of the inner surface of the belts. This arrangement further improves the mechanical efficiency of the track.

A primary feature of the invention is the provision of an inexpensive, mechanically efficient, endless track for tracked vehicles, such as snowmobiles, tractors, and the like.

Another feature of the invention is the provision of such an endless track having improved lateral stability.

A further feature of the invention is the provision of an endless track and driving arrangement therefor which afford a mechanically efficient operation of the track, particularly at high speed operations.

Other features and advantages of the invention will become apparent upon reviewing the following detailed description, the drawing, and the appended claim.

BRIEF DESCRIPTION OF THE DRAWING

FIG. 1 is a fragmentary, side elevational view of an endless track incorporating various of the features of the invention mounted on a pair of drive wheels.

FIG. 2 is a sectional view of the track and the drive wheels along the line 2—2 in FIG. 1.

FIG. 3 is a fragmentary, plan view of the track and the drive wheels shown in FIG. 1.

FIGS. 4–6 are enlarged, cross sectional views illustrating alternate arrangements for the drive lugs and means for mounting the drive lugs on the traction bars.

FIGS. 7 and 8 are enlarged, cross sectional views illustrating alternate arrangements for the drive lugs mounted in coupled relation with side skid lugs.

FIG. 9 is a fragmentary, plan view of an alternate or modified form of the endless track.

FIG. 10 is a fragmentary, sectional view taken along the line 10—10 in FIG. 9.

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Fragmentarily illustrated in FIGS. 1 through 3 is an endless track 11 shown mounted on a pair of drive wheels or sprockets 12 which are connected to a power source (not shown), such as an engine or transmission of a vehicle. While only the drive wheels 12 are shown, it should be understood that the endless track 11 is also trained over a corresponding pair of idler wheels or sprockets which are longitudinally spaced from and are parallel to the drive wheels 12s and hold the track 11 in fairly tight engagement with the drive wheels. Located on the periphery of each drive wheel 12 for driving the endless track 11 are drive elements or sprocket teeth 14 which sequentially engage transversely extending traction bars or cleats 16 provided on the endless track 11.

More specifically, each drive wheel 12 includes a central hub 18 having a bore 20 receving a drive shaft 22 which is drivingly connected to the power source. The sprocket teeth 14 on the drive wheel 12 are circumferentially spaced at equal intervals and have an outer radial extremity 24. The idler wheels are arranged in the same general manner as the drive wheels except the idler wheels do not have to be drivingly connected to the power source.

The endless track 11 illustrated in FIGS. 1 through 3 includes three belts 30 which are formed from a flexible material, such as rubber, and are interconnected for movement in parallel spaced relation about the drive wheels 12 and the idler wheels by the traction bars 16. The traction bars 16 have a generally U-shaped cross section and are longitudinally spaced along the belts 30 at uniform intervals generally corresponding to the circumferential spacing between the sprocket teeth 14 on the drive wheels 12. Each of the traction bars 16 is mounted on the outer surfaces 32 of the belts 30 and is secured to a belt 30 by suitable fastening means such as rivets 34. As described thus far, the construction of the endless belt 11 and the drive wheels 12 is generally conventional.

In accordance with the invention, means are provided on the traction bars 16 for driving of the track 11 by the drive wheels 12 in a mechanically efficient manner. More specifically, mounted on each traction bar in the spacing 38 between adjacent belts 30 are drive lugs 36 which preferably have a generally trapezoidal cross section and are received between adjacent sprocket teeth 14 on the respective drive wheel 12 to be drivingly engaged by the sprocket teeth 14 for driving the track 11. As shown in FIG. 1, each drive lug 36 projects inwardly from the inner side 40 of the respective traction bar 16 and extends beyond the inner surfaces 42 of the belts 30.

While the drive lugs 36 can be formed from a variety of materials, they preferably are constructed from a non-metallic material, such as rubber or plastic material, and are rigidly affixed to the traction bars 16 in a suitable manner. In the specific construction illustrated in FIGS. 1 through 3, the drive lugs 36 are made from a rubber material and are bonded to the traction bars 16, such as by molding individual drive lugs 16 in situ on the traction bars 16.

The mechanical efficiency of the endless track deal 11 can further be improved by arranging the drive elements or sprocket teeth 14 on the drive wheels 12 so that the outer radial extremeties 24 thereof do not operably extend into spacing between adjacent belts, i.e. the operative portions of the sprocket teeth 14 terminate short of the inner surfaces of the belts (see FIGS. 1 and 2).

FIGS. 4 through 6 illustrate alternate forms of the drive lugs and means for affixing the drive lugs to the traction bars. In the alternate form illustrated in FIG. 4, each drive lug 50 is mechanically fastened to the traction bar 16, such as by a rivet 52 extending through a central aperture 54 in the drive lug 52 and an aperture 56 in the traction bar 16.

In the alternate construction illustrated in FIG. 5, each drive lug 60 has a tubular or hollow construction, such as an extruded or stamped part, and is mechanically fastened to the traction bar, such as by a rivet 62 extending through an aperture 64 in the base wall 66 of the drive lug 62 and an aperture 68 in the traction bar 16.

In the alternate construction illustrated in FIG. 6, the drive lug 70 is formed from a rubber or plastic material and is either molded integrally in situ around the traction bar 16 or molded separately with a U-shaped slot for slidably receiving the traction bar 16 so that the drive lug 70 can be installed by slipping over the end of a traction bar 16 and moved into proper location on the traction bar 16.

In accordance with the invention, the lateral stability of the track 11 can be improved without substantially increasing the complexity and cost thereof by providing side skid cleats or lugs which extend from the ground engaging side of the traction bar in a direction opposite to the drive lugs and engage the ground.

Referring to FIGS. 7 and 8, individual side cleats or lugs are affixed to the traction bar 16 in coupled relation with a drive lug and project outwardly beyond the ground engaging edges 76 of the traction bar 16. In the specific construction illustrated in FIG. 7, the side skid cleat or lug 72 and the drive lug 74 are formed from a moldable material, such as rubber, and are molded as a one-piece unit in situ onto the traction bar 16. With this arrangement, both the side skid lug 72 and the drive lug 74 are integrally bounded to the traction bar 16 and are integrally coupled together by a portion 78 extending through an aperture 80 provided in the traction bar 16. The connecting or coupling portion 78 is extruded through the traction bar aperture 80 during the molding process.

In the specific construction illustrated in FIG. 8, the side skid cleat or lug 82 and the drive lug 84 are formed separately and are coupled together by a mechanical fastener, such as by a rivet 86 extending through central apertures 88 and 90 provided in the side skid lug 82 and in the drive lug 84, respectively, and an aperture 92 provided in the traction bar 16. While the side skid cleats or lugs for any of the alternate constructions can have a variety of different shapes, they preferably are frusto-conical.

In FIGS. 9 and 10 an alternate form of endless track 100 is shown for a single drive wheel or sprocket 102. In this embodiment, the endless track 100 includes a pair of flexible belts 104 which are connected for movement in parallel space relation by transversely extending traction bars 106 which are arranged in the same manner as traction bars 16 described above, which are mounted on the belts 104 in the same manner as described above, which include drive lugs as described above and which can include side skid lugs as described above.

It is within the scope of this invention to form both the traction bars and the drive lugs as a one-piece unit from a material, such as a relatively rigid plastic, suitable for use both as a traction bar and a drive lug.

Variations of the features of the invention are set forth in the following claims:

What is claimed is:

1. An endless track comprising a pair of endless flexible belts located in parallel spaced relation and having an outer surface and an inner surface, and a plurality of transversely extending traction bars mounted on said belt outer surfaces in parallel spaced relation, said traction bars having an inner side and each including a drive lug located in the spacing between said belts and projecting inwardly from said inner side of traction bar beyond said belt inner surfaces.

2. An endless track according to claim 1 wherein said drive lugs are made from a non-metallic material and including means for securing said drive lugs to said traction bars.

3. An endless track according to claim 2 wherein said drive lugs are made from a rubber material and said securing means comprises said drive lugs being molded integrally with said traction bars.

4. An endless track according to claim 2 wherein said securing means comprises respective mechanical fasteners extending through said drive lugs and said traction bars.

5. An endless track according to claim 1 wherein said traction bars have an outer side, and further including at least one side skid lug mounted on said outer side of said traction bars and projecting outwardly from said traction bar outer side beyond the outermost extremity of said traction bar.

6. An endless track according to claim 5 wherein one of said side skid lugs is positioned at the location of one of said drive lugs, and means for securing said one side lug and said one drive lug to said traction bar in coupled relation.

7. An endless track according to claim 6 wherein said traction bars include an aperture at the location of said coupled drive lug and side skid lug, and said side skid lug and drive lug are made from the same moldable material and are molded as a one-piece unit with a portion extending through said aperture.

8. An endless track according to claim 6 wherein said coupled side skid lug and drive lug are separate parts and said securing means comprises mechanical fastening means extending through each of said side skid lug, said drive lug, and said traction bar.

9. An endless track according to claim 1 wherein said drive lugs are made from a non-metallic material and each includes a slotted opening for slidably receiving one of said traction bars.

10. An endless track according to claim 1 in combination with a drive wheel aligned with the spacing between said belts and including a series of circumferentially spaced drive elements having an outer radial extremity, said track being trained around said drive wheel with said drive lugs on said traction bars received between said drive elements and the outer radial extremity of said drive elements terminating short of the inner surface of said belt.

* * * * *

PO-1050
(5/69)

UNITED STATES PATENT OFFICE
CERTIFICATE OF CORRECTION

Patent No. 3,944,006            Dated March 16, 1976

Inventor(s) George G. Lassanske

It is certified that error appears in the above-identified patent and that said Letters Patent are hereby corrected as shown below:

Column 1, line 16            delete "in", insert -- In --.

Column 4, line 63            insert ---said--- before "traction bar".

Signed and Sealed this

Tenth Day of August 1976

[SEAL]

Attest:

RUTH C. MASON
*Attesting Officer*

C. MARSHALL DANN
*Commissioner of Patents and Trademarks*